Nov. 4, 1947.   E. L. LUACES ET AL   2,430,024
V-BELT HAVING METALLIC NEUTRAL AXIS
Filed March 8, 1943
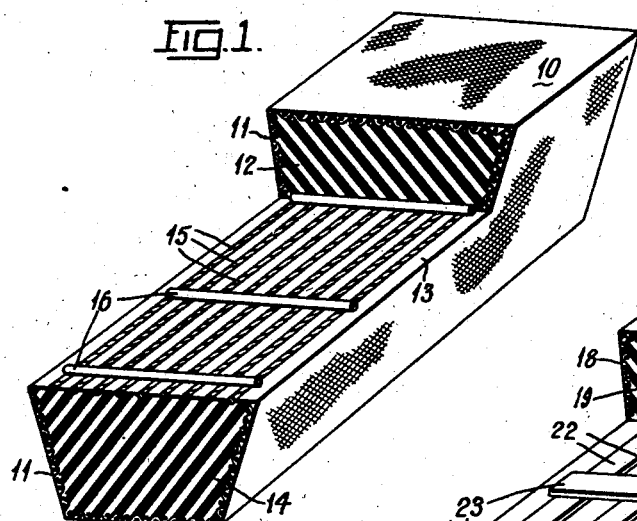
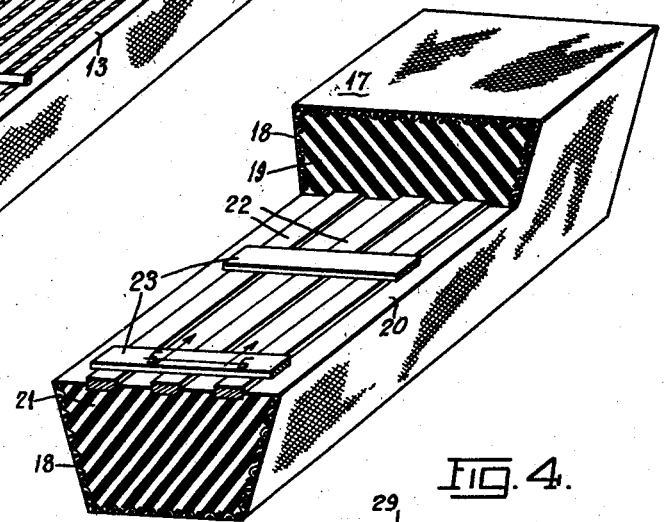
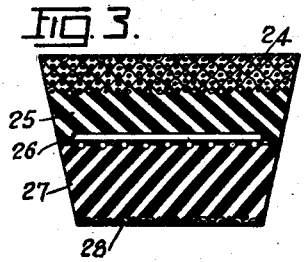
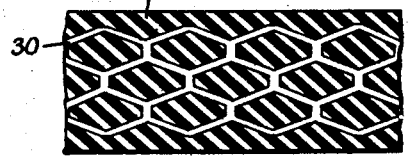
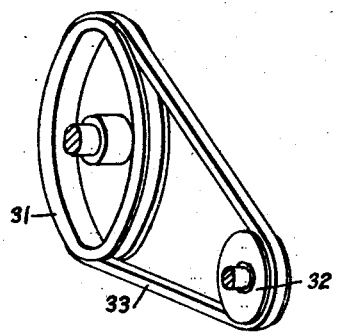
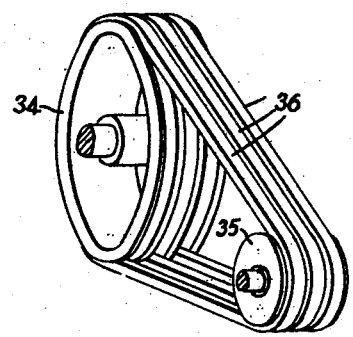
INVENTORS
ENRIQUE L. LUACES,
MELVIN A. CROSBY.
BY
ATTORNEYS Patented Nov. 4, 1947

2,430,024

UNITED STATES PATENT OFFICE 2,430,024

V-BELT HAVING METALLIC NEUTRAL AXIS

Enrique L. Luáces and Melvin A. Crosby, Dayton, Ohio, assignors to The Dayton Rubber Company, a corporation of Ohio Application March 8, 1943, Serial No. 478,430

3 Claims. (Cl. 74—237)

This invention relates to V-belts, and more particularly deals with a V-belt having a metallic neutral axis section of such design that it lends itself well to the formation of a strong and lasting bond between the rubber composition of which the belt body is made and the metallic neutral axis member.

Hitherto V-belts have been designed with a neutral axis section comprising a plurality of substantially inextensible cords made of cotton or similar textile material. More recently it has been suggested that V-belts be constructed with a metallic neutral axis section in order to reduce to a minimum the stretch which results in the course of the service life of a belt and in order to increase such service life.

The ideal V-belt structure might be said to include a neutral axis section comprising an endless band of flexible metal; however, such a belt structure is unobtainable with a satisfactory life and performance because the adhesive bond between the rubber composition of which the belt is made and the metal of the neutral axis is insecure. Such a belt structure, if it were possible of obtainment, would be characterized by substantial longitudinal inextensibility and lateral incompressibility, and these are perhaps two of the most important qualities of a V-belt because they define and determine the efficiency and service life.

The primary purpose of the present invention is to produce a belt structure having insofar as possible the desired advantageous characteristics of longitudinal inextensibility and lateral incompressibility and, in addition, a substantially permanent strong bond between the rubber composition of which the belt is made and the metallic neutral axis member which forms a part thereof.

The nature of the present invention will be more clearly understood from the following description taken in connection with the annexed drawing in which:

Fig. 1 is a perspective view, partly in cross section, of a belt of the wrapped type provided with a metallic neutral axis member;

Fig. 2 is a similar view of a similar belt showing another form of metallic neutral axis member;

Fig. 3 is a cross sectional view of a raw edge belt having a metallic neutral axis member substantially like that shown in Fig. 1;

Fig. 4 is a plan view in cross section of a portion of a raw edge belt taken directly above the neutral axis section and showing a neutral axis member of expanded metal;

Fig. 5 is a view taken along the line 5—5 of Fig. 2 and shows the manner in which the longitudinal and transverse members forming the neutral axis section of the belt are welded together;

Fig. 6 illustrates a typical single belt V-drive; and

Fig. 7 illustrates a typical multi-belt V-drive.

Referring now to the drawing in detail, in Fig. 1 the numeral 10 is a wrapped belt comprising a wrapper 11, a tension section 12, a metallic neutral axis section 13, and a compression section 14. It will be noted that the neutral axis section comprises a plurality of longitudinally disposed parallelly laid metal cords or cables 15 and a plurality of transverse members 16 lying transversely thereof and being permanently united to the metallic cords or cables 15 as by spot welding.

In Fig. 2 the numeral 17 denotes a wrapped belt comprising a wrapper 18, a tension section 19, a metallic neutral axis section 20, and a compression section 21. It will be noted that the neutral axis section 20 comprises a plurality of metallic bands 22 laid parallel to each other and along the longitudinal axis of the belt and a plurality of metallic members 23 lying at right angles thereto and being permanently attached to the metallic bands 22 as by spot welding.

In Fig. 3 the numeral 24 represents a plurality of layers of rubberized fabric forming the top layer of a raw edge belt, 25 is the tension section of rubber composition, 26 is the metallic neutral axis section, 27 is the compression section, and 28 is a layer of rubberized fabric lying along the inner surface of the belt. It will be noted that the neutral axis section comprises a plurality of members lying parallel to each other and along the longitudinal axis of the belt which are held substantially equidistantly spaced and also spaced inwardly from the sides of the belt.

In Fig. 4 the numeral 29 represents the compression section of a raw edge belt and 30 is the neutral axis section comprising a member of expanded metal spaced away from the sides of the belt.

In Fig. 5 the numeral 22 represents the longitudinally arranged members in the belt of Fig. 2, and 23 represents the transversely arranged members of the belt of Fig. 2.

In Fig. 6 the numerals 31 and 32 represent pulleys driven conjointly through the means of a V-belt 33, and in Fig. 7, 34 and 35 represent pulleys driven conjointly through the means of a plurality of V-belts 36.

The belts of the present invention have as an outstanding characteristic a strong adhesive bond between the rubber composition forming the tension and compression sections of the belt and the metallic member which forms the neutral axis section. Because of the stability and the rigidity of the metallic neutral axis section, it is not generally necessary to include in the belt of the present invention any reinforcing material such as fine textile fibers, but the use of such fiber reinforced rubber composition is not precluded.

The strong adhesive bond which exists between the metallic neutral axis member and the rubber composition of the tension and compression sections of the belts of the present invention is primarily mechanical in character. During the vulcanizing or curing of the belt of the present invention under the influence of heat and pressure, the rubber composition of the compression section and the rubber composition of the tension section are caused to flow through the openings between the several members forming the neutral axis section. The material flowing together commingles and becomes, in effect, a coherent single mass or body thereby anchoring permanently and securely the metallic neutral axis member within the rubber body of the belt. While this bond is permanent and secure and suffices to produce a strong durable belt, the adhesion between the metal and the rubber may be increased, if so desired, by first coating the neutral axis member with a plastic or resinous composition which is adapted to adhere securely to metal and to rubber. This step, however, is not within the scope of the present invention and is more fully disclosed and claimed in copending application Serial No. 478,435, filed March 8, 1943.

The metallic neutral axis member may also be treated electrochemically or electrolytically for the purpose of conditioning its surface and increasing the adhesive bond between the metal and the rubber composition of which the belt body is made. However, this step is likewise not a part of the present invention and is more fully disclosed and claimed in copending application Serial No. 478,429, filed March 8, 1943.

The present invention has been described and illustrated as used in connection with raw edge belts and wrapped belts of the non-cog type, but it will be understood that the same principles of construction and the same advantages may be obtained in the case of belts having cogs either on their inner or outer surfaces or on both of these surfaces.

While the invention which is the subject matter of this application has been described in connection with certain embodiments thereof, it is not intended thereby to have this invention limited to or circumscribed by the specific details of construction, arrangement of parts, or materials herein described or illustrated in the annexed drawing in view of the fact that the invention is susceptible to modifications depending on individual preference and conditions without departing from the spirit of this disclosure and the scope of the appended claims.

We claim:
1. A V-belt of rubber-like composition having a neutral axis section comprising a plurality of substantially inextensible metallic members relatively closely spaced to each other, and lying along the longitudinal axis of the belt and parallel to each other and a plurality of metal members lying transverse of said longitudinal members and being rigidly secured thereto, said transverse members extending through the greatest part of the width including the center of the width of said belt whereby lateral incompressibility is provided.

2. A V-belt of rubber-like composition having a neutral axis section comprising a plurality of metal members lying parallel to each other relatively closely spaced to each other and along the longitudinal axis of the belt and a plurality of metal members lying transverse of the longitudinal axis of the belt and forming with said longitudinally disposed members a unitary rigid structure, said longitudinal members extending through the greatest part of the width including the center of the width of the belt.

3. A V-belt of rubber-like composition comprising a compression section, a neutral axis section and a tension section, said sections being bonded to form one integral unit, said neutral axis section comprising a plurality of longitudinally extending metal members relatively closely spaced to each other, and a plurality of transversely extending metal members rigidly secured to said longitudinal members whereby to produce a belt of substantial longitudinal inextensibility and lateral incompressibility.

ENRIQUE L. LUÁCES.
MELVIN A. CROSBY.

REFERENCES CITED

The following references are of record in the file of this patent:

UNITED STATES PATENTS

| Number | Name | Date |
|---|---|---|
| 2,167,384 | Freedlander | July 25, 1939 |
| 2,107,490 | Mayne | Feb. 8, 1938 |
| 2,061,838 | Johns | Nov. 24, 1936 |
| 398,429 | Midgley | Feb. 26, 1889 |
| 1,192,362 | Young | July 25, 1916 |
| 1,360,456 | Shiner | Nov. 30, 1920 |
| 556,663 | Dennison | Mar. 17, 1896 |
| 2,171,055 | Freedlander | Aug. 29, 1939 |
| 2,167,942 | Freedlander | Aug. 11, 1939 |
| 1,113,438 | Hess | Oct. 18, 1914 |
| 1,920,525 | Roderwald | Aug. 1, 1933 |
| 757,919 | Harley | Apr. 19, 1904 |

FOREIGN PATENTS

| Number | Country | Date |
|---|---|---|
| 521,817 | Germany | Mar. 27, 1931 |
| 443,975 | Great Britain | Mar. 11, 1936 |
| 10,432 | Great Britain | June 27, 1889 |
| 28,229 | Great Britain | Dec. 8, 1913 |